US008549093B2

(12) United States Patent  (10) Patent No.: US 8,549,093 B2
Cohen  (45) Date of Patent: Oct. 1, 2013

(54) UPDATING A USER SESSION IN A MACH-DERIVED SYSTEM ENVIRONMENT

(75) Inventor: Joseph Chyam Cohen, Burbank, CA (US)

(73) Assignee: Strategic Technology Partners, LLC, Las Vegas, NV (US)

(*) Notice: Subject to any disclaimer, the term of this patent is extended or adjusted under 35 U.S.C. 154(b) by 533 days.

(21) Appl. No.: 12/586,613

(22) Filed: Sep. 23, 2009

(65) Prior Publication Data

US 2010/0077055 A1    Mar. 25, 2010

Related U.S. Application Data

(60) Provisional application No. 61/099,485, filed on Sep. 23, 2008.

(51) Int. Cl.
G06F 15/167 (2006.01)
(52) U.S. Cl.
USPC ........... 709/213; 709/203; 709/219; 709/220; 709/223; 715/203; 715/788; 718/1
(58) Field of Classification Search
USPC ................. 709/203, 219–220, 223; 715/788, 715/203; 718/1
See application file for complete search history.

(56) References Cited

U.S. PATENT DOCUMENTS

| 4,500,960 A | 2/1985 | Babecki |
| 4,614,841 A | 9/1986 | Babecki |
| 4,625,081 A | 11/1986 | Lotito |
| 4,677,546 A | 6/1987 | Freeman |
| 4,720,850 A | 1/1988 | Oberlander |
| 4,736,321 A | 4/1988 | Brown |
| 4,791,550 A | 12/1988 | Stevenson |
| 5,142,622 A | 8/1992 | Owens |
| 5,146,593 A | 9/1992 | Brandle |
| 5,175,817 A | 12/1992 | Adam |
| 5,179,702 A | 1/1993 | Barkai et al. |
| 5,249,293 A | 9/1993 | Schreiber |
| 5,278,834 A | 1/1994 | Mazzola |

(Continued)

FOREIGN PATENT DOCUMENTS

WO    WO2011036715 A1    3/2011

OTHER PUBLICATIONS

Singh, Amit. "Mac OS X Internals : A Systems Approach" (2006) (Addison Wesley Prof., Pub.; U.S.A., ISBN 0-321-27854-2). See submitted excerpts: Sections 5.1, 6.2, 8.6, 8.7, 9.2, 9.3 and 9.4.

(Continued)

Primary Examiner — Wing F Chan
Assistant Examiner — Hitesh Patel
(74) Attorney, Agent, or Firm — ATFirm PLLC; Ralph P. Albrecht

(57) ABSTRACT

Methods, apparatus, systems and computer program product for updating a user session in a terminal server environment. Transfer of display data corresponding to an updated user interface can occur via a memory shared between an agent server and an agent client in a terminal server environment. Access to the shared memory can be synchronized via token passing or other operation to prevent simultaneous access to the shared memory. Token sharing and synchronized input/output can be performed using FIFOs, sockets, files, semaphores and the like, allowing communications between the agent server and agent client communications to adapt to different operating system architecture.

35 Claims, 4 Drawing Sheets

(56) References Cited

U.S. PATENT DOCUMENTS

| | | |
|---|---|---|
| 5,301,326 A | 4/1994 | Linnett |
| 5,313,581 A | 5/1994 | Giokas |
| 5,349,678 A | 9/1994 | Morris |
| 5,379,432 A | 1/1995 | Bolton et al. |
| 5,396,614 A | 3/1995 | Khalidi |
| 5,400,069 A | 3/1995 | Braun et al. |
| 5,404,529 A | 4/1995 | Chernikoff |
| 5,455,951 A | 10/1995 | Bolton |
| 5,475,845 A | 12/1995 | Bolton et al. |
| 5,513,328 A | 4/1996 | Christofferson |
| 5,546,584 A | 8/1996 | Lundin |
| 5,612,715 A | 3/1997 | Karaki et al. |
| 5,621,884 A | 4/1997 | Beshears |
| 5,675,512 A | 10/1997 | Ireton |
| 5,675,795 A | 10/1997 | Rawson et al. |
| 5,696,901 A | 12/1997 | Konrad |
| 5,764,984 A | 6/1998 | Loucks |
| 5,812,865 A | 9/1998 | Theimer |
| 5,842,226 A | 11/1998 | Barton |
| 5,860,020 A | 1/1999 | Venrooy |
| 5,909,559 A | 6/1999 | So |
| 5,974,444 A | 10/1999 | Konrad |
| 5,982,371 A | 11/1999 | Burridge |
| 5,999,741 A | 12/1999 | May |
| 6,011,920 A | 1/2000 | Edwards |
| 6,049,316 A | 4/2000 | Nolan et al. |
| 6,075,938 A | 6/2000 | Bugnion et al. |
| 6,075,939 A | 6/2000 | Bunnell et al. |
| 6,195,676 B1 | 2/2001 | Spix et al. |
| 6,195,710 B1 | 2/2001 | Borgendale et al. |
| 6,256,657 B1 | 7/2001 | Chu |
| 6,260,075 B1 | 7/2001 | Cabrero et al. |
| 6,275,983 B1 | 8/2001 | Orton et al. |
| 6,308,247 B1 | 10/2001 | Ackerman |
| 6,339,797 B1 | 1/2002 | Inoue |
| 6,343,280 B2 | 1/2002 | Clark |
| 6,351,778 B1 | 2/2002 | Orton et al. |
| 6,374,308 B1 | 4/2002 | Kempf |
| 6,377,962 B1 | 4/2002 | Tindell |
| 6,466,962 B2 | 10/2002 | Bollella |
| 6,567,848 B1 | 5/2003 | Kusuda |
| 6,601,146 B2 | 7/2003 | Auslander |
| 6,606,742 B1 | 8/2003 | Orton et al. |
| 6,668,291 B1 | 12/2003 | Forin et al. |
| 6,677,964 B1 | 1/2004 | Nason et al. |
| 6,684,261 B1 | 1/2004 | Orton et al. |
| 6,714,536 B1 | 3/2004 | Dowling |
| 6,789,256 B1 | 9/2004 | Kechriotis et al. |
| 6,822,943 B1 | 11/2004 | Mantin |
| 6,832,349 B1 | 12/2004 | Seamans |
| 6,842,901 B1 * | 1/2005 | Miller ........................ 718/104 |
| 6,848,997 B1 | 2/2005 | Hashimoto et al. |
| 6,850,255 B2 | 2/2005 | Muschetto |
| 6,889,269 B2 | 5/2005 | Forin et al. |
| 6,912,221 B1 | 6/2005 | Zadikian |
| 7,085,805 B1 | 8/2006 | Ruberg |
| 7,159,222 B1 | 1/2007 | Forin |
| 7,246,182 B2 | 7/2007 | Forin et al. |
| 7,281,246 B1 | 10/2007 | Rapakko |
| 7,287,166 B1 | 10/2007 | Chang |
| 7,403,604 B2 | 7/2008 | Mundra et al. |
| 7,409,694 B2 | 8/2008 | Forin |
| 7,424,704 B2 | 9/2008 | Orton et al. |
| 7,457,887 B1 | 11/2008 | Winkler et al. |
| 7,584,473 B2 | 9/2009 | Forin |
| 7,720,672 B1 | 5/2010 | Buswell et al. |
| 7,730,522 B2 | 6/2010 | Bernabeu-Auban |
| 7,757,230 B2 | 7/2010 | Jascau |
| 7,783,757 B2 | 8/2010 | Plamondon |
| 7,818,773 B2 | 10/2010 | Yurt |
| 7,861,006 B2 | 12/2010 | McNulty |
| 7,865,934 B2 | 1/2011 | Wobber |
| 7,882,254 B2 | 2/2011 | Choi et al. |
| 7,882,317 B2 | 2/2011 | Hunt |
| 7,921,375 B2 | 4/2011 | Laird-McConnell |
| 7,950,066 B1 | 5/2011 | Zuili |
| 8,079,021 B2 | 12/2011 | Buswell et al. |
| 8,099,664 B2 | 1/2012 | Alam et al. |
| 8,112,529 B2 | 2/2012 | Smit et al. |
| 8,254,898 B2 | 8/2012 | Abramson et al. |
| 8,255,570 B2 | 8/2012 | Samuels et al. |
| 8,272,048 B2 | 9/2012 | Cooper et al. |
| 8,285,857 B2 | 10/2012 | Hochmuth et al. |
| 8,312,371 B2 | 11/2012 | Ording |
| 8,327,272 B2 | 12/2012 | Anzures et al. |
| 8,332,476 B2 | 12/2012 | Abramson et al. |
| 8,335,863 B2 | 12/2012 | Wookey |
| 8,351,333 B2 | 1/2013 | Rao et al. |
| 8,392,497 B2 | 3/2013 | Vilke et al. |
| 2002/0171734 A1 | 11/2002 | Arakaw |
| 2003/0009657 A1 | 1/2003 | French |
| 2003/0041147 A1 | 2/2003 | Smit et al. |
| 2003/0048275 A1 | 3/2003 | Ciolac |
| 2004/0088576 A1 | 5/2004 | Foster et al. |
| 2004/0103416 A1 | 5/2004 | Bolton et al. |
| 2005/0155043 A1 | 7/2005 | O'Brien et al. |
| 2006/0092187 A1 | 5/2006 | Wang |
| 2006/0203007 A1 * | 9/2006 | Bullard et al. ................ 345/619 |
| 2006/0206820 A1 * | 9/2006 | Bullard et al. ................ 715/733 |
| 2006/0282253 A1 | 12/2006 | Buswell et al. |
| 2007/0124474 A1 * | 5/2007 | Margulis ........................ 709/226 |
| 2007/0143704 A1 | 6/2007 | Laird-McConnell |
| 2007/0168650 A1 | 7/2007 | Misra et al. |
| 2007/0239953 A1 | 10/2007 | Savagaonkar et al. |
| 2008/0127292 A1 | 5/2008 | Cooper et al. |
| 2008/0136819 A1 | 6/2008 | Shivas et al. |
| 2008/0165202 A1 | 7/2008 | Brodersen et al. |
| 2008/0183811 A1 * | 7/2008 | Kotras et al. .................. 709/203 |
| 2008/0250432 A1 | 10/2008 | Bolton et al. |
| 2008/0250433 A1 | 10/2008 | Bolton et al. |
| 2009/0016566 A1 * | 1/2009 | Goto et al. .................... 382/100 |
| 2009/0080523 A1 * | 3/2009 | McDowell ............... 375/240.15 |
| 2009/0094523 A1 | 4/2009 | Treder et al. .................. 715/738 |
| 2009/0097751 A1 * | 4/2009 | McDowell ..................... 382/181 |
| 2009/0100125 A1 * | 4/2009 | McDowell ..................... 709/203 |
| 2009/0100483 A1 * | 4/2009 | McDowell ..................... 725/109 |
| 2009/0178062 A1 | 7/2009 | Westen |
| 2009/0193441 A2 | 7/2009 | Orton et al. |
| 2009/0193442 A2 | 7/2009 | Bolton et al. |
| 2009/0210817 A1 * | 8/2009 | Schmieder et al. ........... 715/781 |
| 2009/0238204 A1 * | 9/2009 | Kipnis et al. .................. 370/466 |
| 2009/0262122 A1 * | 10/2009 | Darsa et al. .................... 345/545 |
| 2009/0271863 A1 | 10/2009 | Govindavajhala |
| 2010/0017526 A1 * | 1/2010 | Jagannath et al. ............ 709/229 |
| 2010/0077047 A1 | 3/2010 | Cohen |
| 2010/0077055 A1 | 3/2010 | Cohen |
| 2010/0077085 A1 | 3/2010 | Cohen |
| 2010/0077090 A1 | 3/2010 | Cohen |
| 2010/0077155 A1 | 3/2010 | Cohen |
| 2010/0115532 A1 | 5/2010 | Peterson |
| 2010/0223417 A1 | 9/2010 | Cheng |
| 2010/0268828 A1 | 10/2010 | Pahlavan |
| 2010/0268941 A1 | 10/2010 | Pahlavan |
| 2010/0269046 A1 | 10/2010 | Pahlavan |
| 2010/0269048 A1 | 10/2010 | Pahlavan |
| 2010/0278435 A1 | 11/2010 | Aquera y Arcas |
| 2011/0126001 A1 | 5/2011 | Fu |
| 2011/0296515 A1 | 12/2011 | Krstic et al. |
| 2012/0072898 A1 | 3/2012 | Pappas et al. |
| 2012/0089769 A1 | 4/2012 | Buswell et al. |
| 2012/0185863 A1 | 7/2012 | Krstic et al. |
| 2012/0284329 A1 | 11/2012 | Van den Oord et al. |
| 2012/0324365 A1 | 12/2012 | Momchilov et al. |
| 2012/0331406 A1 | 12/2012 | Baird et al. |
| 2013/0002725 A1 | 1/2013 | Kim et al. |

OTHER PUBLICATIONS

Baratto, Thinc: A Remote Display Architecture for Thin-Client Computing, Columbia University Technical Report CUCS-027-04, Jul. 2004.

Coultart, THINCing Together: Extending THINC for Multi-User Collaborative Support, Columbia University, 2004.

Yang, The Performance of Remote Display Mechanisms for Thin-Client Computing, USENIX Annual Technical Conference Paper, 2002.

Miquel van Smoorenburg. "wall(1): send message to everybody's terminal", publicly posted Jul. 12, 2007, <http://web.archive.org/web/20070712074642 1linux.die.netlman/1/wall>, 2 pages, reprinted Jul. 10, 2013.

Linux NetKit. "rpc.rwalld", Jun. 7, 1993, 1 page.

"Mac OS Technology Overview, Developer," Apple, Jul. 23, 2012.

AppleInsider Staff, "Mac OS X 10.7 Lion to introduce multi-user screen sharing," accessed Jul. 10, 2013 at: <http://appleinsider.com/articles/11/03/31/mac_os_x_10_7_lion_to_introduce_multi_user_screen_sharing>, Mar. 31, 2011.

U.S. Appl. No. 61/099,549, filed Sep. 23, 2008, Expired.
U.S. Appl. No. 61/099,485, filed Sep. 23, 2008, Expired.
U.S. Appl. No. 61/099,469, filed Sep. 23, 2008, Expired.
U.S. Appl. No. 61/099,497, filed Sep. 23, 2008, Expired.
U.S. Appl. No. 61/099,474, filed Sep. 23, 2008, Expired.

\* cited by examiner

UPDATING A USER SESSION IN A MACH-DERIVED SYSTEM ENVIRONMENT

CROSS-REFERENCE TO RELATED APPLICATIONS

This application claims the benefit of provisional patent application Ser. No. 61/099,485, filed Sep. 23, 2008, which is incorporated by reference.

FEDERALLY SPONSORED RESEARCH

Not applicable.

SEQUENCE LISTING OR PROGRAM

Not applicable.

FIELD OF THE INVENTION

The invention relates to the field of computer networks. In particular, the present invention relates to methods, apparatus, systems and computer program product for updating a user session in a terminal server environment.

BACKGROUND

For enterprises large and small, consolidation of hardware and software is increasingly vital due to reasons of accessibility, reliability, data security, cost and the administration of applications and the network itself. Managing remote users, their computing experience and their access to networks is similarly crucial. Many different types of institutions have used terminal server applications to provide a computing environment and to address these issues, despite having varied institutional and computing objectives. For instance, educational institutions deploy computer networks to allow teachers, students and staff to connect remotely, thereby allowing increased productivity, easier access to information, rapid communication and, ultimately, enhanced learning opportunities. Government agencies are perhaps more concerned with data security, which is why terminal services always have been essential to their information technology infrastructures. Thin client and network deployments have been mandated in several agencies—this allows all operations to be performed centrally, and secures and monitors information that may have been sent or received. Commercial organizations, as well, benefit from deploying terminal servers so that data transmission can be managed and controlled; for example, by requiring users to access data through smart cards and biometrics, and allowing editing and review of the data only within a secure environment, or by certain identified users. And in the case of organizations of all types there is a growing need for network users to access information via mobile or handheld devices from remote locations.

Centralized computing results in cost savings, ease of administration and enhanced security. Since almost all the processing of an application is done on a central server, companies are not forced to continuously upgrade or replace client or user hardware to keep pace with the systems requirements of modern applications. Maintenance of applications is isolated to the application server and not each individual node, also reducing administrative overhead. Servers are usually located in secure data centers, reducing the risk of physical theft. Centralized malware and audit processes also facilitate enhanced security. In addition, replacing workstations with thin clients can reduce energy consumption, environmental costs, support cost, and hardware costs.

In certain terminal server environments, however, implementing multiple independent instances of applications to satisfy the demands of remote clients leads to issues in being able to securely and synchronously update the graphical display of server output. Simply transmitting the output from certain output agents, such as via window server, for example, may lead to information being passed across user session boundaries, as the graphical data available would be that created by the most recent client session to access the application. As a result, a need exists for an improved method for updating graphical display information securely and in a timely fashion in a terminal server environment. There is also a need for an improved means to transport data from a user's session in a terminal server environment, allowing improved communications with a remote device.

SUMMARY

The disclosed embodiments relate to methods, apparatus, systems and computer program product for updating a user session in a terminal server environment. In accordance with a preferred embodiment, the disclosed methods, apparatus, systems and computer program product allow faster and less-error-prone transfer of display data corresponding to an updated user interface via a memory shared between an agent server and an agent client in a terminal server environment. This shared server-client arrangement is sometimes described herein as a "KVM agent" server/client system (referring to keyboard, video and mouse). In certain embodiments, accessing the shared memory is synchronized via token passing or other operation to prevent simultaneous access to the shared memory. In certain embodiments, this token sharing and synchronized input/output can be performed using FIFO pipes, sockets, files, semaphores and the like, allowing communications between the agent server and agent client communications to adapt to different operating system architecture. In a preferred embodiment, the agent pair implementation is protocol independent. Thus, among the advantages disclosed herein, one or more aspects are to provide a faster and more robust computing environment. Other advantages relate to an improved ability to transfer large amounts of display-associated data. These and other advantages of the many aspects of the disclosed embodiments will become apparent from a review of the following description and corresponding figures.

DRAWINGS

The accompanying drawings, which are incorporated in and constitute a part of this specification, illustrate embodiments of the invention and together with the description serve to explain the principles of the invention.

Figure 3A:
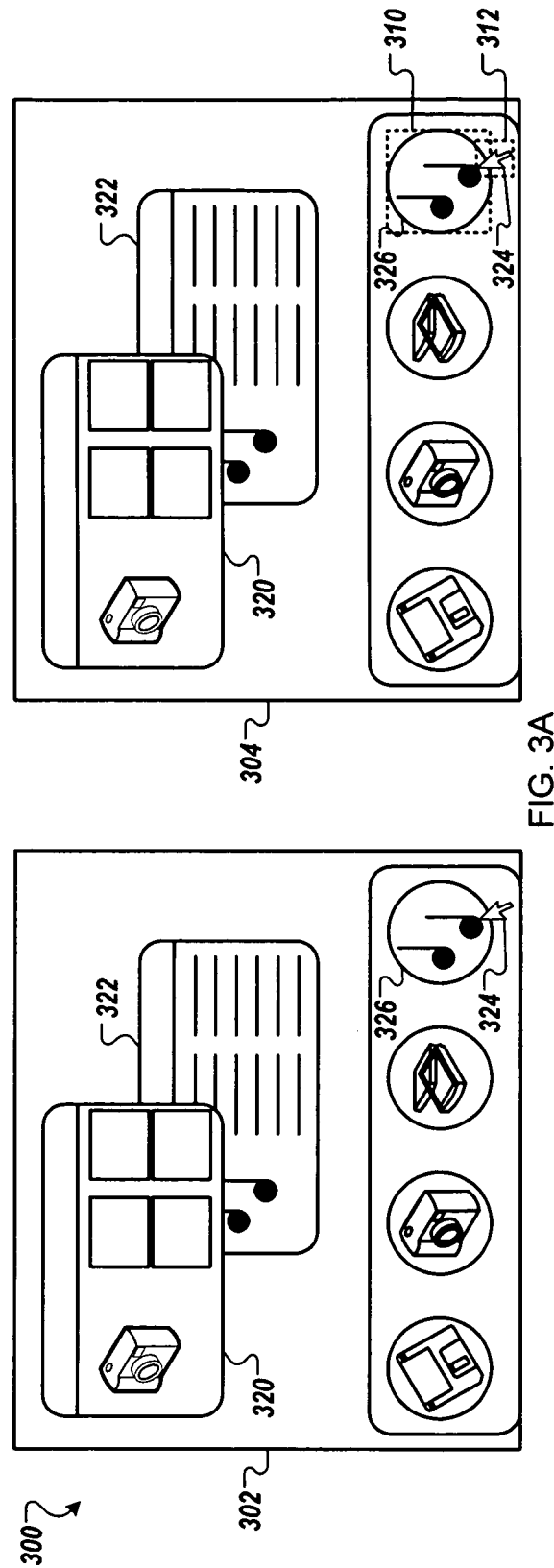
Figure 3B:
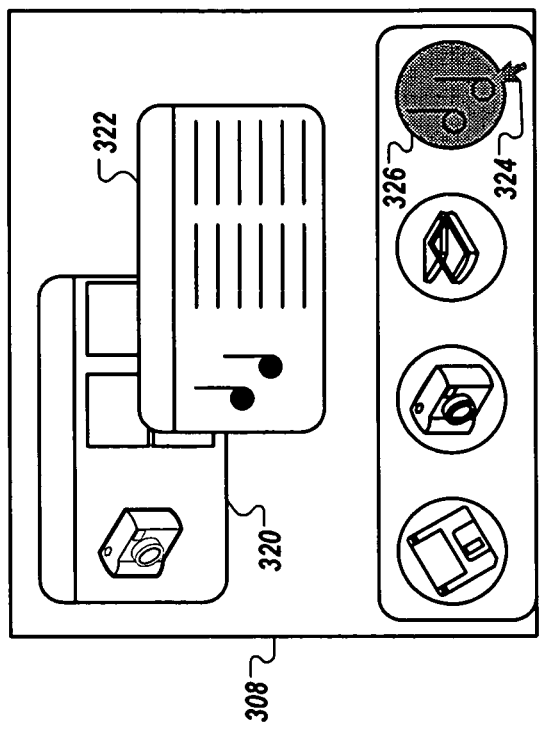
Figure 3B:
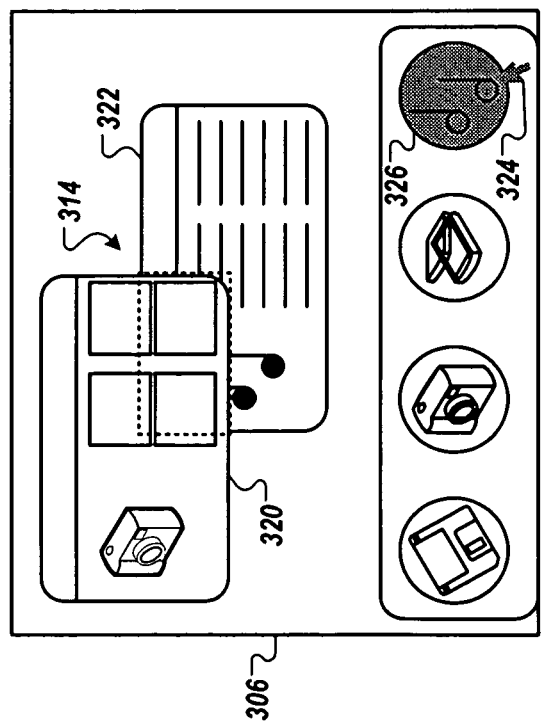

FIGS. 3A-B are graphical depictions of user interface instances exemplifying the use of dirty rectangles to indicate areas of change to a user interface.

DETAILED DESCRIPTION

Exemplary embodiments of the present invention are now described in detail, including depiction of the hardware components which serve as the context for the process embodiments.

Figure 1:
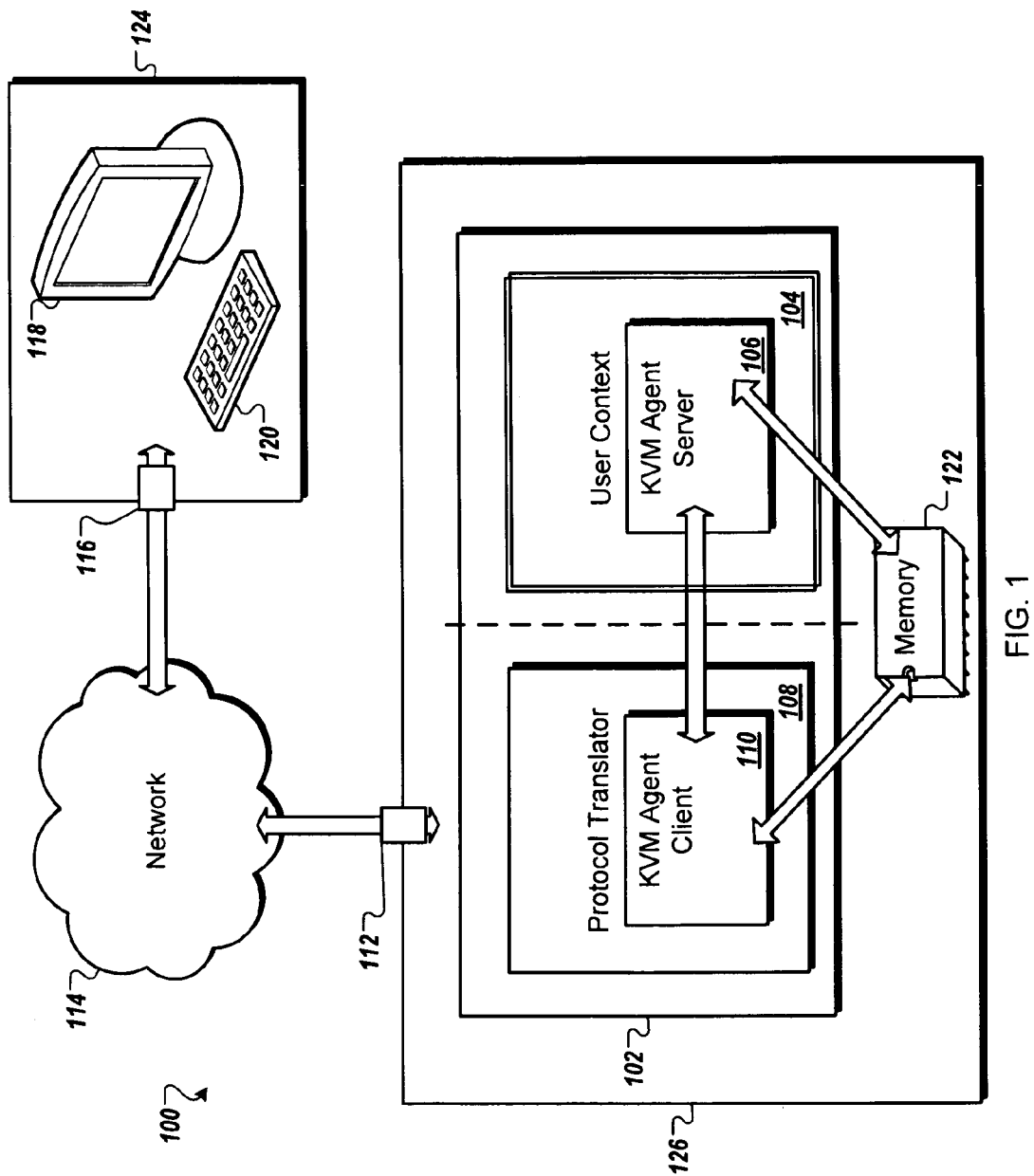
FIG. 1 is a graphical depiction of an exemplary computer network according to one embodiment of the disclosure.

FIG. 1 shows an example computer network 100, which can include architectural elements corresponding to at least one input and/or output of a user context (or session). In some implementations, the computer network 100 can include a host system 126. An operating system 102 can be executed on the host system 126, the operating system 102 including one or more of a user context 104, a KVM agent server 106, a KVM agent client 110, a protocol translator 108, and a host communication socket 112. The host system 126 also can include, a memory component 122, which is accessible to the operating system 102 and the user context 104. The computer network 100 further can include a remote system 124. The remote system 124 can include one or more of a remote communications socket 116, an output device 118, such as a display and/or speakers, and at least one input device 120, such as a keyboard and/or mouse. The remote system 124 and the host system 126 can communicate over a shared network 114, which can be a public network, e.g. the Internet, a private network, e.g. a Local Area Network (LAN), or a combination thereof.

The remote system 124 can be any computing system configurable to communicate over the shared network 114, such as a desktop computer, a laptop computer, a palm top computer, a server, a mobile communications device, and an embedded computing system. The remote system 124 can receive input and provide output through the input device 120 and the output device 118. Further, the remote system 124 can be configured to communicate with the shared network 114 through a wired or wireless connection.

The host system 126 also can be any computing system configurable to communicate over the shared network 114, such as a desktop computer, a laptop computer, a palm top computer, a server, a mobile communications device, and an embedded computing system. The operating system 102 can be executed on the host system 126, and can be configured to provide an application environment in which one or more application programs can be executed. For example, the operating system 102 can be a Mac OS provided by Apple Inc. of Cupertino, Calif., a Windows operating system provided by Microsoft Corporation of Redmond, Wash., or a Linux operating system. In some implementations, the host system 126 can act as a server for the remote system 124. Further, the host system 126 can be separated from the remote system 124 by any distance. For example, the remote system 124 can be a desktop computer located at an employee's home and the host system 126 can be a server located at an employer's site.

The user context 104, which in some implementations can be referred to as a user session or a graphical session, can be configured as a single environment in which the user can access one or more functions of the operating system. A single user context is shown in FIG. 1, but the operating system 102 can be configured to host multiple user contexts. In some implementations, each user context, such as the user context 104, is kept separate from all other existing user contexts. For example, separate memory utilization, file system access, and/or process execution can be maintained for each user context. In this way, actions and/or functions associated with one user context can be isolated to reduce their impact on one or more other existing user contexts and the host operating system. It will be appreciated that some actions taken in one user context can affect one or more other user contexts. For example, use of system resources by one user context can directly or indirectly reduce the system resources available to one or more other user contexts. In another example, a user context can be given special privileges to monitor or interact with one or more other user contexts, such as for maintenance purposes.

The KVM agent server 106 and the KVM agent client 110 can provide remote input and output for a user context 104 hosted by the operating system 102. For example, the KVM agent server 106 and the KVM agent client 110 can provide one or more of a control device input, such as a keyboard and/or mouse, an audio output, an image output, and/or a video output. The KVM agent client 110 and the KVM agent server 106 further can be configured to transmit information into and/or out of a user context, such as the user context 104. In some implementations, the amount of data used to represent an input and/or an output can be small, such as keyboard input, mouse input, or an audio output representing a beep. This data can be passed from the KVM agent client 110 to the KVM agent server 106 directly using a software construct, such as a socket, pipe, port, FIFO, or inter-process message passing, e.g. Mach, without significantly impacting the operating system 102 or the host system 126. Further, the message passing can be performed serially and asynchronously, such that the messages are passed in the correct order. The objects sending and/or receiving information can be idle between messages. In one example, key presses of A, B, and C can be passed and received in the order "A, B, C."

In some implementations, the amount of data used to represent an input and/or an output, such as biometric, video, or streaming audio data, can be too large for passing using a software construct, such as a socket, pipe, port or inter-process message passing. For example, the video data associated with a twenty-inch computer monitor can take up to forty seconds to be passed by software running on a modern hardware architecture. Many computer monitor screens can refresh at a rate of sixty times per second. Accordingly, direct message passing between the KVM agent client 110 and the KVM agent server 106 cannot accommodate the amount of data associated with video.

Large amounts of input and/or output data can be passed between the KVM agent server 106 and the KVM agent client 110 by way of shared memory 122. Shared memory software tools such as Universal Pages Lists (UPL), POSIX, SYSV, the Unix environment program "pmap" and the X is not Unix (XNU) environment programs "MachVM" and "VM" can be used to share memory between the KVM agent client 110 and KVM agent server 106. Further, metadata corresponding to the shared memory can be transmitted between the KVM agent client 110 and KVM agent server 106. For example, the metadata can be transmitted via a socket, FIFO pipe or port. The metadata can describe any aspect of the shared memory, including what data is stored in the shared memory and the order in which the data is stored.

The protocol translator 108 can be configured to translate input and output data associated with the KVM agent client 110 into a protocol that can be utilized by a remote client, such as the Virtual Network Computer (VNC) protocol, the Remote Desktop Protocol (RDP), or the X11 protocol. The protocol translator 108 can communicate with one or more remote clients via the host communication socket 112. For example, a connection between the host communication socket 112 and the remote communication socket 116 can be established over a communication network, such as the shared network 114. Communications between the host communication socket 112 and the remote communication socket 116 can be serial and asynchronous, such that the messages are passed in the correct order and the objects sending and receiving information can be idle during the time between messages. Output data can be presented through the output device 118. In some implementations, the output device 118 can be a computer monitor, a speaker, a projector, or other device appropriate for outputting data generated by the operating system 102. Further, input data can be entered using the input device 120, which can be a keyboard, a mouse, a touch screen, a keypad, a joystick, a touch pad, or other device appropriate for receiving input, directly or indirectly, from a user.

Figure 2:
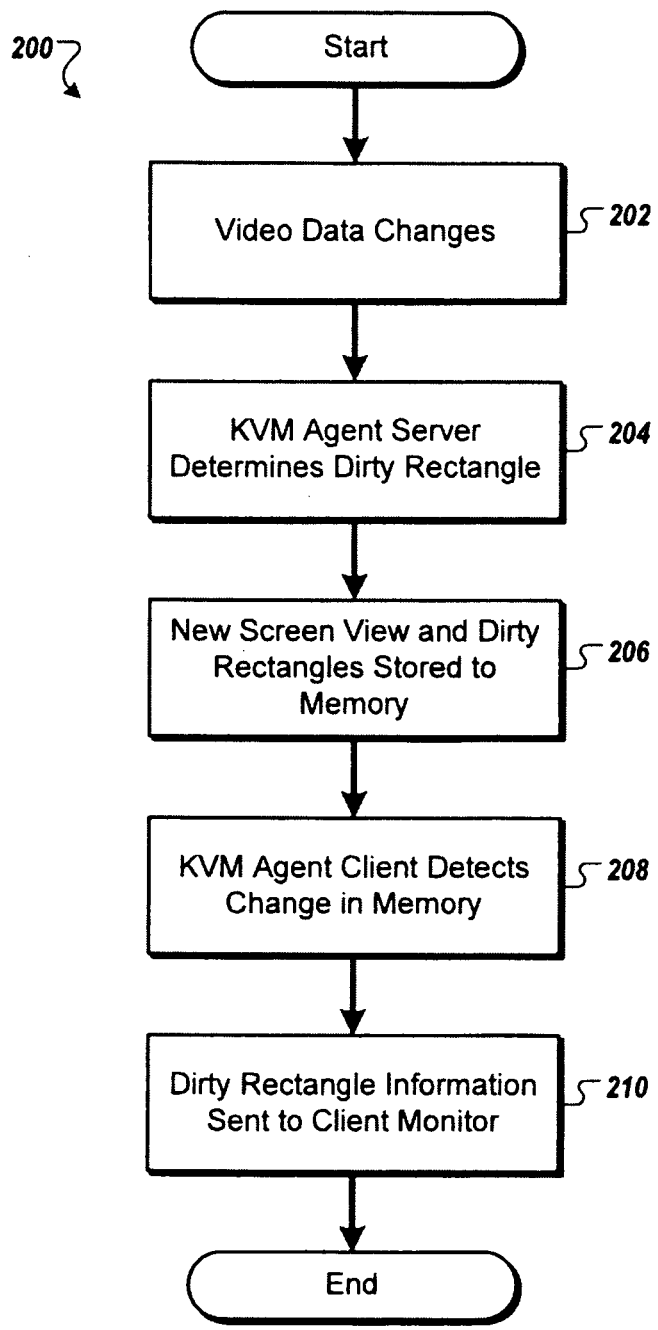
FIG. 2 is a flow chart of an exemplary process for providing video data to a remote device.

FIG. 2 shows a flow chart of an example process (200) for providing video data to a remote device. Video data associated with a user context executing in an operating system can change (202) in response to many circumstances. For example, with respect to a user interface corresponding to a user context, the time presented by a clock can be incremented, a cursor can move to a new position, or data associated with an application can be altered. A KVM agent server associated with the user context can determine (204) which sections of the user interface have been updated. In some implementations, sections of a user interface that have been updated can be designated as rectangular spaces and can be referred to as 'dirty rectangles'.

An updated representation of the user interface for a user context and information corresponding to one or more dirty rectangles can be stored in a shared memory location (206). A KVM agent client can be configured to monitor the shared memory location and detect changes (208). When a change is detected, the KVM agent client can access the dirty rectangle information and transmit display information to a remote device (210) for presentation. In some implementations, information corresponding to the dirty rectangles can be transmitted. In other implementations, updated display information can be transmitted. The dirty rectangle information and/or updated display information can be transmitted via shared memory or a communications path, such as a socket, a pipe, a port, or messaging infrastructure. The client monitor can be associated with a remote system and can communicate with the operating system via a shared network, such as the Internet or a LAN. The output presented on the client monitor can be updated based on the dirty rectangles, so that only the portion of the interface that has changed is updated.

FIG. 3A shows a plurality of user interface instances presented on a display, such as a display associated with a remote computing system. The user interface instance 302 precedes temporally the user interface instance 304. For example, the user interface instances 302 and 304 can represent the display of a computer monitor which receives one or more output signals from an operating system. Further, the operating system generating the output signals can be executing on a computing system that is remote from the computing system to which the computer monitor is connected.

In the user interface instance 302, a photo application window 320 is presented above a music application window 322. Further, the photo application window 320 overlaps with, and thus partially obscures, the music application window 322. Additionally, a mouse cursor 324 is presented in the user interface instance 302 such that it is positioned over a music program icon 326. In the user interface instance 304, the mouse cursor 324 and the music program icon 326 are highlighted, such as in response to a mouse click. Rectangles 310 and 312 can be generated by the operating system to represent a minimum bounding box around the mouse cursor 324 and the music program icon 326. The rectangles 310 and 312 are illustrative of the areas in which the user interface instance has changed, as determined by the operating system, and are not displayed on the computer monitor. These rectangles 310 and 312 represent dirty rectangles that indicate areas of change to the user interface. Thus, the rectangles 310 and 312 represent the change between the user interface instance 302 and the user interface instance 304.

In some implementations, the rectangles 310 and 312 also can be optimized. For example, the rectangles 310 and 312 can be combined to form one larger rectangle, such as by expanding one or more borders to form a single rectangle. In another example, two or more rectangles can be used to represent a single, nonrectangular shape. The two or more rectangles can be specified to minimize the portion of the user interface covered by the rectangles that has not changed. In some other implementations, nonrectangular shapes also can be used.

For example, input such as the click of a mouse may be made on the input device 120 of FIG. 1. The remote system 124 can send this input information through the socket 116, through the network 114 to the socket 112. The input information then can be passed from the socket 112 to the protocol translator 108, which can translate the input information and pass it to the KVM agent client 110. The KVM agent client 110 can then pass the input to the KVM agent server 106.

In this example, the user interface information can be updated from the user interface instance 302 to the user interface instance 304. The information related to the dirty rectangles 310 and 324 can be sent from the KVM agent server 106 to the memory 122. The KVM agent client 110 can detect change to the information stored in the memory 112 and can pass the dirty rectangle information to the protocol translator 108. The protocol translator 108 can translate the dirty rectangle information and can send it through the socket 112 to the shared network 114. The dirty rectangle information can then be routed over the shared network 114, through the socket 116, to the remote client 124. The remote client 124 can use the dirty rectangle information to generate an updated interface for display on the output device 118. In other embodiments, updated display information can be transmitted from the host system 126 to the remote system 124, based on the dirty rectangles.

FIG. 3B shows a plurality of user interface instances presented on a display, such as a display associated with a remote computing system. The user interface instance 306 precedes temporally the user interface instance 308. The difference between the user interface instances 304 and 306 is illustrated by the rectangle 314. The operating system can cause the music application window 322 to be displayed in front of the photo application window 320, such as in response to a mouse click selecting the music application icon 326. Thus, the music application window 322 now partially obscures the photo application window 320. The operating system further can generate video output data to update only to the section of the display at which the change in overlap, represented by the rectangle 314, has occurred. The video output data generated can be passed to the remote client 124 to be displayed on the output device 118 as previously described.

In one example of desktop computing use, the area of a display output that is changed from one user interface instance to the next can be a small percentage of the total display area, such as 10%. However, the display output may not change between some user interface instances, for example if there is no input and the operating system does not change any of the displayed features. Alternatively, a large portion of the display output may change between some user interface instances. For example, an application launched in full screen mode can cause the entire display to change.

A rectangle, or other shape, defining an area of change can be expressed using a number of different conventions. For example, a rectangle can be defined by (X, Y, Height, Width), where X represents the distance between the lower left corner of a rectangle and the left side of the screen, Y represents the distance between the lower left corner of a rectangle and the bottom of the screen, Height represents the height of the rectangle, and Width represents the width of the rectangle. In another example, a rectangle, or other shape, can be defined by (X1,Y1, X2,Y2), where X1,Y1 represents the coordinates of the upper left corner of the rectangle and X2,Y2 represents the lower right corner of the rectangle. Any other system for expressing an object location also can be used.

In some implementations, information defining an area of change can be stored in the memory 122 along with the output information of the dirty rectangles 310, 312, or 314. The information defining an area of change can be used to generate information for updating a display or other such output. For example, the protocol translator 108 and/or the remote system 124 can modify an output of a user interface instance in accordance with an identified dirty rectangle.

The embodiments described above are given as illustrative examples only. It will be readily appreciated by those skilled in the art that many deviations may be made from the specific embodiments; accordingly, the scope of the invention is to be determined by the claims below rather than being limited to the specifically described embodiments above. In addition, the flowcharts found in the figures are provided to instruct a programmer of ordinary skill to write and debug the disclosed embodiments without undue effort; the logic flow may include other steps and the system other components. The invention is not limited to a particular expression of source or object code. Accordingly, other implementations are within the scope of the claims.

What is claimed:

1. A method for updating a user instance, the method comprising:
  creating at least one user context on a Mach-derived system comprising at least one processor, wherein each of the at least one user context incorporates an agent server;
  associating the agent server with an agent client, wherein the agent client and the agent server are executed on the Mach-derived system, but in separate processes;
  generating, by the agent server, data corresponding to an updated user instance,
    wherein the data corresponding to the undated user instance comprises user data, wherein the user data comprises at least one of:
      display data, audio data, biometric data, input data, image data, output data, video data, streaming data, touch screen data, keypad data, joystick data, touchpad data, keyboard data, mouse data, metadata, smart device data, input device data, data from another device appropriate for receiving input directly or indirectly from the user, computer monitor data, speaker data, projector data, data from another device appropriate for outputting data, or output device data;
  determining, by the agent sever, that any portion of the user data has been updated;
  transferring the data to the agent client via a system communication facility based on said determining,
    wherein said transferring comprises:
      transferring at least one of:
        the user date, or
        metadata corresponding to a shared memory comprising the any portion of the updated user data,
      between the agent server and the agent client, wherein at least one of the user data or the metadata is transmitted via the system communication facility,
        wherein the system communication facility comprises at least one of:
          a socket,
          a file,
          a port, or
          a pipe; and
  transmitting the data over a network to a remote system for update of the user instance based on the data,
    wherein said transmitting comprises:
      transmitting at least of the user data, or the metadata, over the network to the remote system
    for update of the user instance based on the updated user data or metadata.

2. The method of claim 1 wherein the system communication facility is selected from the group consisting of: a shared memory, a socket, a port, a first-in first-out buffer, and inter-process message passing.

3. The method of claim 2 wherein the inter-process message passing is a Mach inter-process communication.

4. The method of claim 1 wherein the agent client communicates with two or more agent servers.

5. The method of claim 1 wherein the transmitting the data over a network is accomplished via a protocol translator.

6. The method of claim 5 wherein the agent client communicates with two or more protocol translators.

7. The method of claim 1 wherein the agent server communicates with two or more agent clients.

8. A computer network system comprising:
  a Mach-derived network system comprising one or more processor elements and one or more memory elements, wherein the Mach-derived network system is in communication with two or more computing devices, and wherein the one or more processor elements are programmed or adapted to:
  create a user context associated with each user instance, wherein each user context incorporates an agent server;
  associate the agent server with an agent client, wherein the agent client and agent server are run on the Mach-derived network system, but in separate processes;
  generate, by the agent server, data corresponding to an updated user instance,
    wherein the data corresponding to the undated user instance comprises user data, wherein the user data comprises at least one of:
      display data, audio data, biometric data, input data, image data, output data, video data, streaming data, touch screen data, keypad data, joystick data, touchpad data, keyboard data, mouse data, metadata, smart device data, input device data, data from another device appropriate for receiving input directly or indirectly from the user, computer monitor data, speaker data, projector data, data from another device appropriate for outputting data, or output device data;
  determine that any portion of the user data has been updated;
  transfer the data to the agent client via a system communication facility based on said determining,
    wherein said transfer comprises:
      transfer of at least one of:
        the user data or
        metadata corresponding to a shared memory comprising the any portion of the updated user data,
      between the agent server and the agent client, wherein the one or more processor elements are programmed or adapted to transmit at least one of the user data or the metadata via the system communication facility, wherein the system communication facility comprises at least one of:
- a socket,
- a file,
- a port, or
- a pipe; and transmit the data over a network to at least one of said two or more computing devices for update of the user instance based on the data, wherein said transmit comprises:
transmit of at least one of the user data, or the metadata, over the network to the at least one of said two or more computing devices for update of the user instance based on the updated user data or metadata.

9. A non-transitory, tangible computer-readable storage media comprising stored instructions that, upon execution by at least one programmable processor, are operable to cause the at least one programmable processor to perform the method of claim 1.

10. The method according to claim 1, wherein said Mach-derived system comprises at least one of: a laptop, a desktop, a palmtop, a client, a server, a mobile communications device, or an embedded computing device.

11. The method according to claim 1, wherein the remote system comprises at least one of: a client, a thin client, a desktop, a server, a laptop, a palmtop, a mobile communications device, or an embedded computing device.

12. The method according to claim 1, wherein the method comprises at least one of:
receiving data from at least one input facility; or
transferring data to at least one output facility.

13. The method according to claim 12, wherein said at least one input facility comprises at least one of: a smartcard device, a biometric device, a direct input device, a storage media device, a keyboard, a memory, a storage device, a mouse, a touch pad device, a network device, a display touchscreen, a video input device, an audio input device, a keypad, or a joystick.

14. The method according to claim 13, wherein said at least one output facility comprises at least one of: a smartcard device, a storage device, a direct output device, a storage media device, a memory, a display, a video output device, a monitor, a screen, a speaker, a projector, a network device, or a touchscreen display.

15. The method according to claim 12, wherein said network comprises at least one of: a public network, a private network, a local area network, a wide area network, an intranet, or an Internet public network.

16. The method according to claim 1 wherein the system communication facility comprises at least one of: a shared memory, a socket, a port, a pipe, a first-in first-out buffer, or an inter-process message passing facility.

17. The method according to claim 1 wherein said system communication facility comprises inter-process message passing.

18. The method according to claim 17, wherein said inter-process message passing comprises Mach inter-process communication.

19. The method according to claim 2, wherein said shared memory comprises at least one of: a Universal Pages Lists, POSIX, SYSV, pmap, or MachVM.

20. The method according to claim 5, wherein said protocol translator comprises at least one of: a virtual network computer protocol; a remote desktop protocol; or an X11 protocol.

21. The method according to claim 1, wherein said Mach-derived system comprises a Mach-derived terminal server.

22. The method according to claim 21, wherein said Mach-derived terminal server comprises a Mac operating system (OS).

23. The method according to claim 1, wherein said agent server is a KVM agent server.

24. The method according to claim 1, wherein said agent client is a KVM agent client, further comprising configuring said KVM agent client to detect a change in the shared memory.

25. A method for execution on a computing device comprising at least one processor and at least one memory, and wherein the computing device is adapted to be coupled to a network for communication with a Mach-derived system comprising at least one processor and at least one memory, the method comprising:

receiving, by the at least one processor of the computing device, an update to a user instance, wherein the update is received from the Mach-derived system; and wherein the update was previously transmitted by the Mach-derived system over the network, and wherein data was previously transferred over a system communication facility of the Mach-derived system, wherein the data transferred comprises at least one of: user data, or metadata corresponding to a shared memory comprising an T portion of the updated user data, wherein the at least one of the user data or the metadata was transmitted via the system communication facility wherein the system communication facility comprises at least one of: a socket. a file, a port, or a pipe, wherein the data was created on the Mach-derived system, wherein the Mach-derived system comprises a user context comprising an agent server, the agent server associated with an agent client, wherein the agent client and the agent server execute on the Mach-derived system the agent client executing in a process separate from the agent server, wherein the data was generated by the agent server corresponding to the updated user instance, wherein the data corresponding to the updated user instance comprises the user data. wherein the user data comprises at least one of: display data, audio data, biometric data, input data, image data, output data, video data, streaming data, touch screen data, keypad data, joystick data, touch pad data. keyboard data, mouse data the metadata smart device data, input device data, data from another device appropriate for receiving input directly or indirectly from the user, computer monitor data, speaker data, projector data, data from another device appropriate for outputting data, or output device data;

transmitting, by the at least one processor of the computing device, input data received from at least one input device of the computing device, over the network to the Mach-derived system; and outputting, by the at least one processor of the computing; device, data included in the update of the user instance based on the data received from the Mach-derived system.

26. The method according to claim 25, wherein said network comprises at least one of:
a wireless network; or
a wired network.

27. A computing device system for communicating, over a network, with a Mach-derived system comprising at least one processor and at least one memory, comprising:
- a computing, device comprising:
- at least one processor; and
- at least one memory,
- wherein said computing device is adapted to be coupled to the network for access to the Mach-derived system,
- wherein said at least one processor of said computing device is adapted to:
  - receive an update to a user client instance, wherein the update is received from the Mach-derived system and wherein the update was previously transmitted by the Mach-derived system over the network, and wherein data was previously transferred over a system communication facility of the Mach-derived system, wherein the data transferred comprises at least one of: user data, or metadata corresponding to a shared memory comprising any portion of the updated user data wherein the at least one of the user data or the metadata was transmitted via the system communication facility, wherein the system communication facility comprises at least one of: a socket, a file, a port, or a pipe, wherein the data was created on the Mach-derived system, wherein the Mach-derived system comprises a user context comprising an agent server, the agent server associated with an agent client, wherein the agent client and the agent server execute on the Mach-derived system, the agent client executing in a process separate from the agent server, wherein the data was generated by the agent server corresponding to the updated user instance, wherein the data corresponding to the updated user instance comprises the user data, wherein the user data comprises at least one of: display data, audio data, biometric data, input data, image data, output data, video data, streaming data, touch screen data, keypad data. joystick data, touch pad data, keyboard data, mouse data, the metadata, smart device data, input device data. data from another device appropriate for receiving input directly or indirectly from the user, computer monitor data, speaker data, projector data, data from another device appropriate for outputting data, or output device data;
  - transmit input data received from at least one input device of said computing device, over the network to the Mach-derived system; and
  - output data included in the update of the user instance based on the data received from the Mach-derived system.

28. The computing device system according to claim 27, wherein the computing device system communicates via the network with the Mach-derived system via at least one protocol comprising at least one of:
- a virtual network computer protocol (VNC);
- a remote desktop protocol (RDP); or
- an X11 protocol.

29. The computing device system according to claim 27, wherein said at least one processor of said computing device adapted to output comprises:
- wherein said at least one processor of said computing device is adapted to:
- render the updated user instance based on the output data included in the update of the user instance based on the data received from the Mach-derived system.

30. The method according to claim 1, wherein the method comprises at least one of:
- implementing a plurality of independent instances of at least one application to satisfy demands of a plurality of remote systems;
- providing a secure and synchronously updated graphical display of system output to a plurality of remote systems;
- updating graphical display information securely and in a timely fashion in a terminal server environment;
- transporting data from a user session in a terminal server environment;
- allowing improved communication with at least one remote device;
- updating at least one user session in a terminal server environment;
- allowing improved transfer of large amounts of display-associated data; or
- allowing faster and less-error-prone transfer of user data corresponding to an updated user interface via at least one memory shared between the agent server and the agent client in a terminal server environment.

31. The method according to claim 1, wherein at least one of said Mach-derived system, or said remote system comprises a computer system executing a Mach-derived operating system.

32. The method according to claim 31, wherein said Mach-derived operating system comprises a MAC operating system (OS).

33. The computer network system according to claim 8, wherein at least one of said Mach-derived network system, or at least one of said two or more computing devices comprises a computer system executing a Mach-derived operating system.

34. The computer network system according to claim 33, wherein said Mach-derived operating system comprises a MAC operating system (OS).

35. The method according to claim 1, wherein said remote system is local to said Mach-derived system.

* * * * *

UNITED STATES PATENT AND TRADEMARK OFFICE
CERTIFICATE OF CORRECTION

PATENT NO.        : 8,549,093 B2
APPLICATION NO.   : 12/586613
DATED             : October 1, 2013
INVENTOR(S)       : Joseph Chyam Cohen Page 1 of 1

It is certified that error appears in the above-identified patent and that said Letters Patent is hereby corrected as shown below:

In the Claims:

In column 7, claim 1, line 43, delete "undated" and replace with --updated--.

In column 7, claim 1, line 62, delete "the user date, or" and replace with --the user data, or--.

In column 8, claim 1, line 10, after "transmitting at least", insert --one--.

Signed and Sealed this
Tenth Day of December, 2013

Margaret A. Focarino
*Commissioner for Patents of the United States Patent and Trademark Office*